United States Patent
Strosser

(10) Patent No.: US 7,707,811 B1
(45) Date of Patent: May 4, 2010

(54) HEADER FLOTATION AND LIFT SYSTEM WITH DUAL MODE OPERATION FOR A PLANT CUTTING MACHINE

(75) Inventor: Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/423,960

(22) Filed: Apr. 15, 2009

(51) Int. Cl.
*A01D 41/27* (2006.01)
*A01D 41/14* (2006.01)
*A01D 46/08* (2006.01)
*A01D 75/28* (2006.01)

(52) U.S. Cl. .................................................. 56/10.2 E
(58) Field of Classification Search ............... 56/10.2 E, 56/10.2 D, 10.2 F, 10.2 R, 208, DIG. 15
See application file for complete search history.

(56) References Cited

U.S. PATENT DOCUMENTS

| | | | |
|---|---|---|---|
| 3,908,345 A | 9/1975 | Oni et al. | |
| 4,335,561 A | 6/1982 | Swanson et al. | |
| 4,409,778 A * | 10/1983 | McNaught | 56/10.2 A |
| 4,594,840 A * | 6/1986 | D'Almeida et al. | 56/11.2 |
| 4,622,803 A | 11/1986 | Lech | |
| 4,942,724 A * | 7/1990 | Diekhans et al. | 56/10.4 |
| 5,359,836 A | 11/1994 | Zeuner et al. | |
| 5,463,854 A * | 11/1995 | Chmielewski et al. | 56/10.2 E |
| 5,469,694 A * | 11/1995 | Panousheck et al. | 56/10.2 E |
| 5,471,823 A * | 12/1995 | Panoushek et al. | 56/10.2 E |
| 5,471,825 A | 12/1995 | Panoushek et al. | |
| 5,473,870 A | 12/1995 | Panoushek et al. | |
| 5,535,577 A | 7/1996 | Chmielewski et al. | |
| 5,577,373 A * | 11/1996 | Panoushek et al. | 56/10.2 E |
| 5,633,452 A * | 5/1997 | Bebernes | 73/37 |
| 5,704,200 A * | 1/1998 | Chmielewski et al. | 56/10.2 E |
| 5,937,621 A * | 8/1999 | Eggenhaus | 56/10.2 E |
| 5,964,077 A | 10/1999 | Guinn | |
| 6,530,197 B1 * | 3/2003 | Christensen et al. | 56/10.2 E |
| 6,588,187 B2 * | 7/2003 | Engelstad et al. | 56/10.2 E |
| 6,758,029 B2 * | 7/2004 | Beaujot | 56/10.2 E |
| 6,826,894 B2 * | 12/2004 | Thiemann et al. | 56/10.2 E |
| 6,883,299 B1 * | 4/2005 | Gramm | 56/10.2 E |
| 7,168,226 B2 | 1/2007 | McLean et al. | |
| 7,168,229 B1 * | 1/2007 | Hoffman et al. | 56/208 |
| 7,222,474 B2 * | 5/2007 | Rayfield et al. | 56/10.2 E |
| 7,222,475 B2 * | 5/2007 | Bomleny et al. | 56/10.2 E |
| 7,310,931 B2 * | 12/2007 | Gramm | 56/208 |
| 7,401,455 B1 * | 7/2008 | Cleodolphi | 56/10.2 E |
| 7,430,846 B2 * | 10/2008 | Bomleny et al. | 56/10.2 E |
| 7,555,883 B2 * | 7/2009 | Fackler et al. | 56/10.2 E |
| 7,603,837 B2 * | 10/2009 | Ehrhart et al. | 56/10.2 E |
| 2003/0140609 A1 * | 7/2003 | Beaujot | 56/10.2 E |
| 2006/0248868 A1 | 11/2006 | Otto et al. | |
| 2007/0068129 A1 | 3/2007 | Strosser | |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A method and system for controlling the operation of a header lift and flotation system for a plant cutting machine, which provides dual modes of operation, including a first mode allowing operator settable and controllable header height with an upward floatation or up-float capability, and a second ground contact mode having a full (up and down float) capability. The system is automatically operable for switching between the two modes responsive to predetermined input commands, and can automatically calibrate for changes in the header weight so as to provide consistent float function and feel.

19 Claims, 7 Drawing Sheets

HEADER FLOTATION AND LIFT SYSTEM WITH DUAL MODE OPERATION FOR A PLANT CUTTING MACHINE

TECHNICAL FIELD

The present invention relates to agricultural plant cutting and harvesting machines, such as windrowers, combines and the like, and, more particularly, to a method and system for controlling the operation of a header lift and flotation system for such a machine, which provides dual modes of operation, including a first mode allowing operator settable and controllable header height with an upward floatation or up-float capability, and a second ground contact mode having a full (up and down float) capability, and which system is automatically operable for switching between the two modes responsive to predetermined input commands, and can automatically calibrate for changes in the header weight so as to provide consistent float function and feel.

BACKGROUND ART

Generally, a header flotation capability is desirable to allow the header to ride lightly up and over rises in the terrain during field operation. Full flotation, that is, the capability for both upward and downward movement, may be desired when the header is carried in contact with the ground, to enable cutting plants close to the ground surface while avoiding potentially damaging impacts with raised terrain features and fixed obstacles. An upward flotation or up-float capability, that is, wherein only upward float movements are allowed, may be desired when the header is carried at some elevation or height above the ground, for cutting plants at that height, while riding over obstacles that are encountered at that height. A lift capability is required for moving the header to a desired cutting height, and also to a height above the cutting height, such as for turning in a headland of a field, movement between fields, travel over roads, and the like.

It is known to provide a header height or lift control system which uses an accumulator and hydraulic cylinders to also provide a flotation capability. Such systems typically use separate hydraulic cylinders for the lift and flotation functions, which is disadvantageous cost-wise and in terms of complexity. Many such systems also lack the capability of independently adjusting the flotation force for each side of the header. This can be a shortcoming, as some headers are not inherently balanced side to side. In many cases, special considerations must be made to float and lift these headers evenly by adding ballast, which can become unreasonably heavy or awkward, or modifying the lift geometry of one side.

It has been found to be desirable to have a capability to more easily, and preferably automatically, switch between a ground following or contacting cutting mode wherein a full flotation function is available, and a raised height control mode, having only an up float function. It has also been found that flotation function can degrade over time, as a result of a variety of conditions, particularly changes in header weight and weight distribution, such as can result from build-up or removal of cut plant material, and/or dirt, soil, mud, and the like, on the header. Hydraulic fluid temperature and viscosity variations can also affect flotation function. And, one or more of these conditions can vary during a single plant cutting session, e.g., soil build-up on cutter bar or disk heads, plant material build-up occurs or is removed, making it desirable to have a capability to calibrate or adjust flotation settings frequently for optimal operation, preferably automatically.

Accordingly, what is sought is a method and system for controlling the operation of a header flotation and lift system for a plant cutting machine, which provides dual modes of operation, including a first mode allowing operator settable and controllable header height with an up-float capability, and a second ground contact mode having a full float capability, and which system is automatically operable for switching between the two modes responsive to predetermined input commands, and can automatically calibrate or adjust for changes in header weight and other conditions, and which overcomes one or more of the shortcomings and limitations set forth above.

SUMMARY OF THE INVENTION

What is disclosed is a method and system for controlling flotation and lift of a header for a plant cutting machine, which provides dual modes of operation, including a first mode allowing operator settable header height with an up-float capability, and a second ground contact mode having a full float capability, and which method and system is automatically operable for switching between the two modes responsive to predetermined input commands. Also disclosed is a capability to automatically calibrate or adjust for changes in header weight and other conditions, and to overcome one or more of the shortcomings and limitations set forth above.

According to a preferred aspect of the invention, the system and method automatically monitors height commands received from an input device, and if a height command having a value greater than a predetermined value is received, can automatically set or position the header at the commanded height relative to a datum or reference such as the frame, in an up-float mode. In this mode, the header can be moved upwardly from the commanded height by exertion of an external upwardly directed force thereagainst, and the header will return to the commanded height when the force is removed. If a height command having the predetermined value or a lower value is received, the system and method automatically controls the header in a full float mode supported by a surface therebeneath wherein the header is movable upwardly and downwardly responsive to changes in elevation of the surface supporting the header.

According to another preferred aspect of the invention, the predetermined value is selected to be zero, or a similarly low value, for example, as would typically be assigned or selected for achieving ground contact and operation in a terrain following full float mode.

According to another preferred aspect of the invention, if a condition or conditions is/are present which are suitable for calibrating the header weight value, which can be, for instance, a received height command having a value equal to or greater than a predetermined high value, e.g., representative of a headland, turning or travel mode, the system and method will responsively set or position the header at that height in a non-float mode, and automatically determine and store a calibrated value representative of a weight or mass of the header for use in controlling the float force and movements of the header during subsequent operation in one or both of the float modes. This calibration value is preferably determined as a function of a pressure condition required for supporting the header stationary in the non-float mode, and is preferably determined each time that the header is raised in a fixed height mode, such as a maximum height, as will typically be done when turning or during travel between fields or on roads. This can also be done when another condition is present, for example, such as a turning motion with the header raised.

As an illustration of the weight calibration capability of the invention, the pressure for holding the header at the selected height will be monitored, and if an increase in the pressure from a previous value required for holding position is now required to hold the position, it can be determined that the an applied load influencing the weight or mass of the header has increased, as a result of, e.g., mud, soil or crop residue build up. Conversely, a decrease in the required pressure from the previously required value will indicate a weight or mass decrease, as can occur when the header is cleaned, mud dries, etc. A change can also indicate that the header has been changed. Typically, an operator will raise the header to a height greater than the cutting height when turning in the headlands of a field, and when traveling between fields or a sections of a field. Thus, the value for the weight or mass of the header can be consistently calibrated or updated, during all or any of these raised turning or traveling events, or at some time during such events, such that subsequently, when the header is operated in one of the float modes, the float force can be more accurately and consistently applied.

Thus, as an advantage of the invention, if an operator selects a desired float force level or feel, and a parameter or parameters affecting the mass or weight of the header changes, e.g., build-up of mud, dirt, crop material on the header, etc., the system can automatically responsively calibrate for the changes, to determine a new applied fluid pressure required for maintaining the selected force or feel, such that, to the operator, float characteristics, e.g., forces and vibrations from ground contact and impacts will be consistent.

As still another preferred aspect of the invention, the header can be supported using one or more conventional drivers, such as a fluid cylinder or cylinders, operable for providing the lift and float functions. More preferably, a single driver such as a fluid cylinder supports each side of the header, and the system is operable for determining or calibrating the fluid pressure required for each side independently, to accommodate differences in weight of the sides, and to enable adjusting for the expected differences and changes in loading conditions of the respective sides, such as can occur, for instance, when a greater quantity of crop material or dirt build up occurs on one side or the other, or only one of the sides is cleaned.

As another preferred aspect, the invention uses a pressure sensor for determining fluid pressure in or in connection with each of the drivers, preferably independently, in a closed loop system configured and operable for using the pressure information for automatically controlling or regulating the fluid pressure in the drivers for exerting the desired or set float force. This is advantageous, as it minimizes the effect of temperature changes or variations. This is also advantageous as it automatically adjusts fluid pressure, continuously if required, for maintaining a consistent float pressure throughout contact induced header movements.

As still another preferred aspect, the invention uses a position sensor, preferably independently for each side of the header, enabling accurately positioning the header at a selected height in reference to a datum, e.g., the full raise position, and/or positioning the header at a lateral (side to side) tilt wherein a differential height condition will exist. This also enables automatically controlling or regulating the velocity of downward movements of the header in the float modes. This is advantageous, as it can minimize the effect of header mass and momentum on the rate of drop or downward movements. In the up-float mode, driver pressure and header position information are monitored and analyzed to assess if ground contact is made, and, if so, the system will automatically provide the up-float capability, to regulate or minimize the resulting ground contact force. In the full float mode, closed loop position control in combination with closed loop velocity control (drop rate control) is used to accurately lower the header to achieve ground contact, as will be indicated by pressure change. Position information can also be monitored and analyzed to provide the system with further information to enhance the capability of maintaining the ground contact force at the set level.

DETAILED DESCRIPTION OF THE INVENTION

Figure 1:
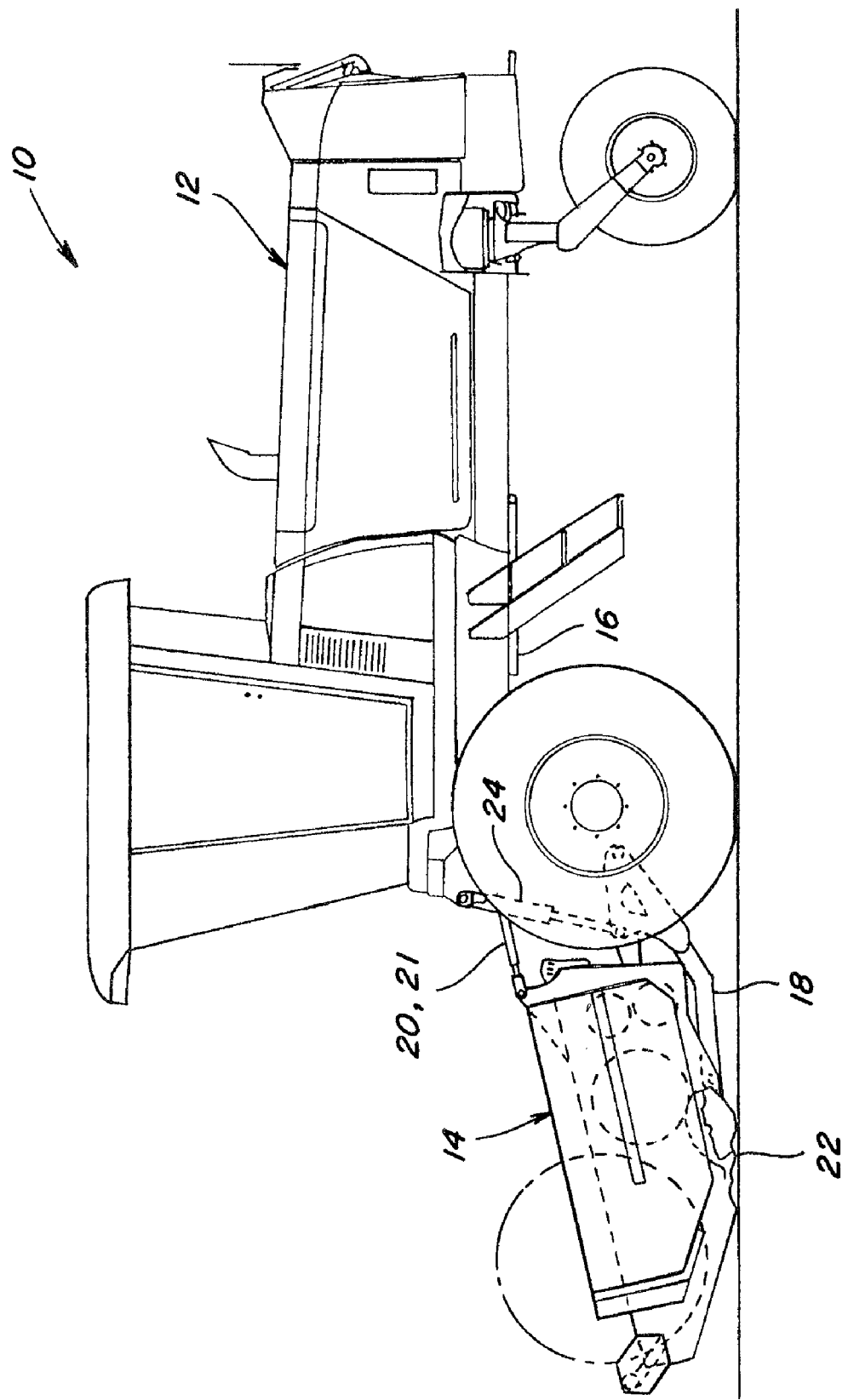
FIG. 1 is a side view of a crop harvesting machine of the type with which the invention may be used, with a header of the machine supported on a surface therebelow representative of a ground following position wherein a full float mode of the invention would be used, and showing elements of the lift and flotation system of the invention operable for effecting operation in the full float mode.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right", and "LH" or "RH" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

FIGS. 1, 2, 3 and 4 show the present invention utilized in connection with a crop harvesting machine which is a self-propelled windrower 10; however, it will be appreciated that the principles of the present invention are not limited to a self-propelled windrower, or to any specific type of harvesting or plant cutting machine.

In the illustrated embodiment, the self-propelled windrower 10 comprises a tractor 12 and a header 14, the header 14 being attached to the front end of a frame 16 or chassis of the tractor 12. The header may be of generally any suitable construction and design, and may include not only crop-harvesting mechanisms, but also crop conditioners and the like. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 the extension and retraction of which is controlled by the operator to remotely control the angle of cutters 22 (e.g., sickle or disc) on the lower front of the header 14.

Figure 2:
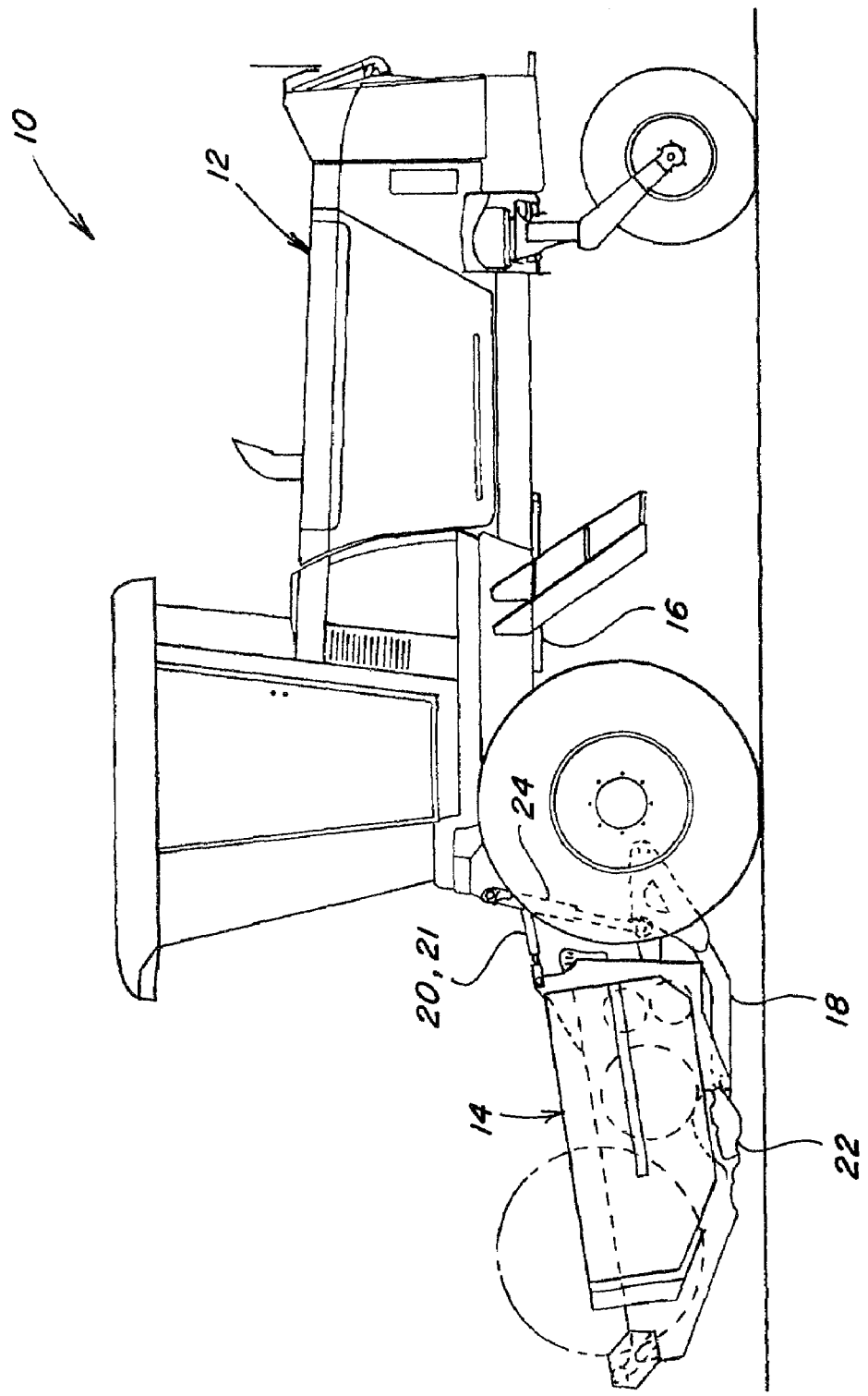
FIG. 2 is another side view of the machine, with the header supported by drivers of the system in a raised position representative of positions wherein an up-float mode of the invention would be used.
Figure 3:
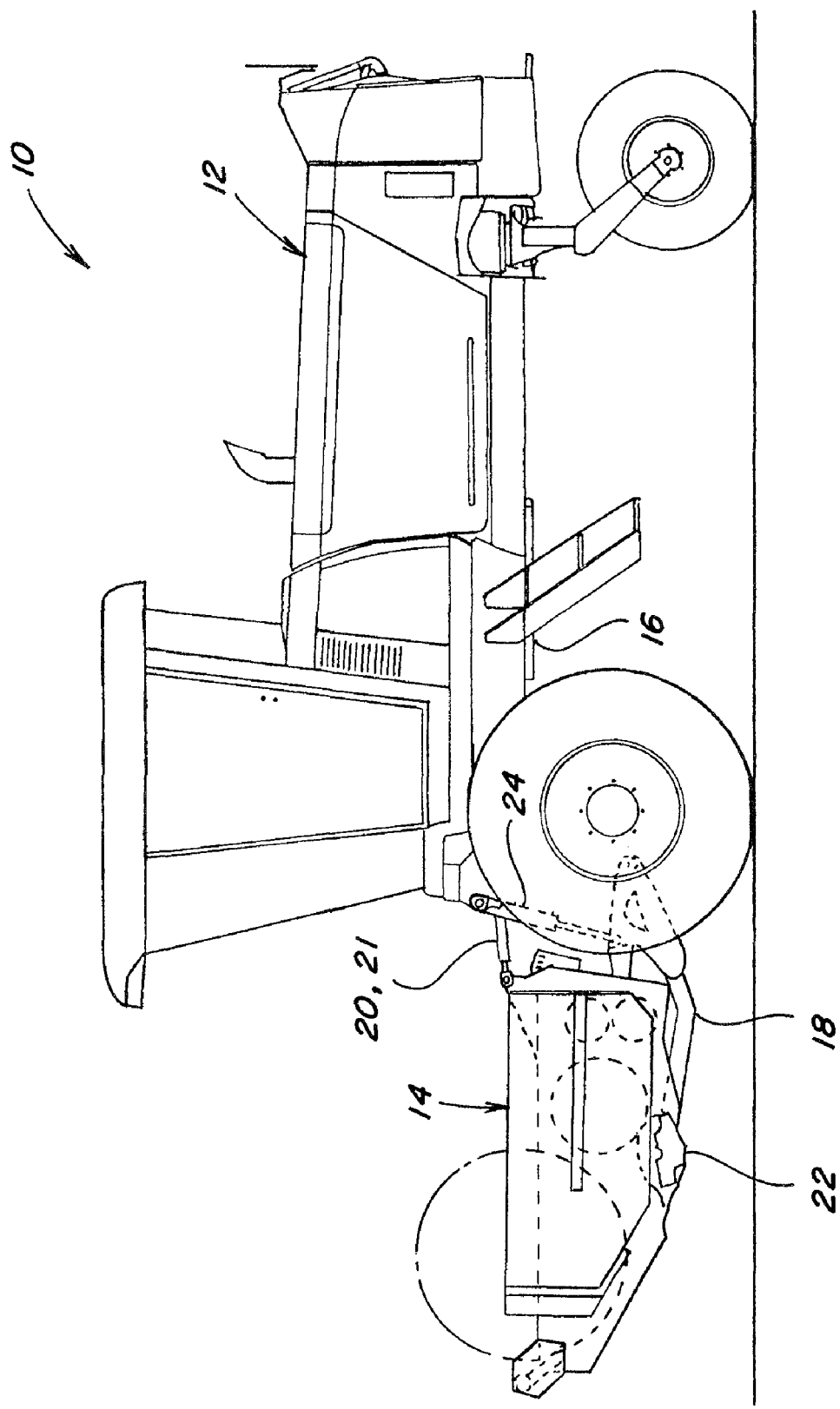
FIG. 3 is still another side view of the machine, with the header supported in a fully raised position representative of a position wherein a weight of the header would be calibrated using the invention.
Figure 4:
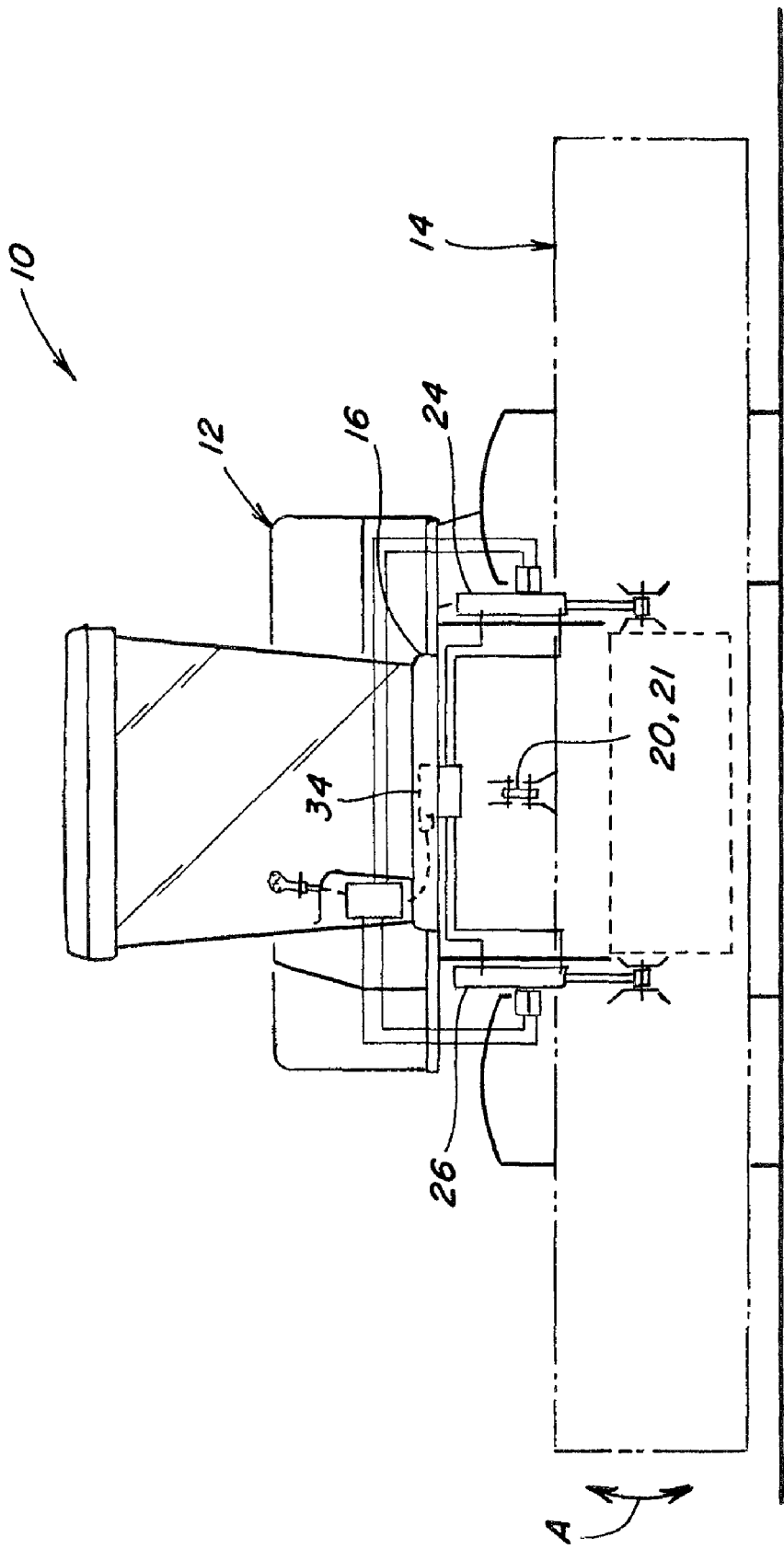
FIG. 4 is a front end view of the machine, showing the header raised and showing elements of the system of the invention.

Lift/flotation drivers, which preferably comprise fluid cylinders 24, 26, are utilized for interconnecting the lower arm 18 and the frame 16, i.e., each side of the header being supported by its own lift/flotation cylinder (only the left cylinder 24 being shown in FIGS. 1, 2 and 3, the right cylinder 26 also being visible in FIG. 4).

The method and system of the invention are configured and adapted for managing and controlling the operation of the lift and flotation functions that control the lift/flotation drivers, e.g., cylinders 24, 26. This is done independently for cylinders 24, 26 on the opposite sides of the machine for the present system which is an independent system, and jointly if desired, for a non-independently controlled system (not shown). More specifically, the control system accomplishes two generally separate control functions, one for the right side lift/flotation driver and one for the left. An advantage of the independent system is an ability to control cylinders 24 and 26 of windrower 10 to extend and retract by different extents, for effecting lateral tilting of header 14 relative to tractor 12, in either sideward direction, to a desired extent. In actuality, the two systems may be totally separate, or they may share some operational components and a similar cylinder structure.

Figure 5:
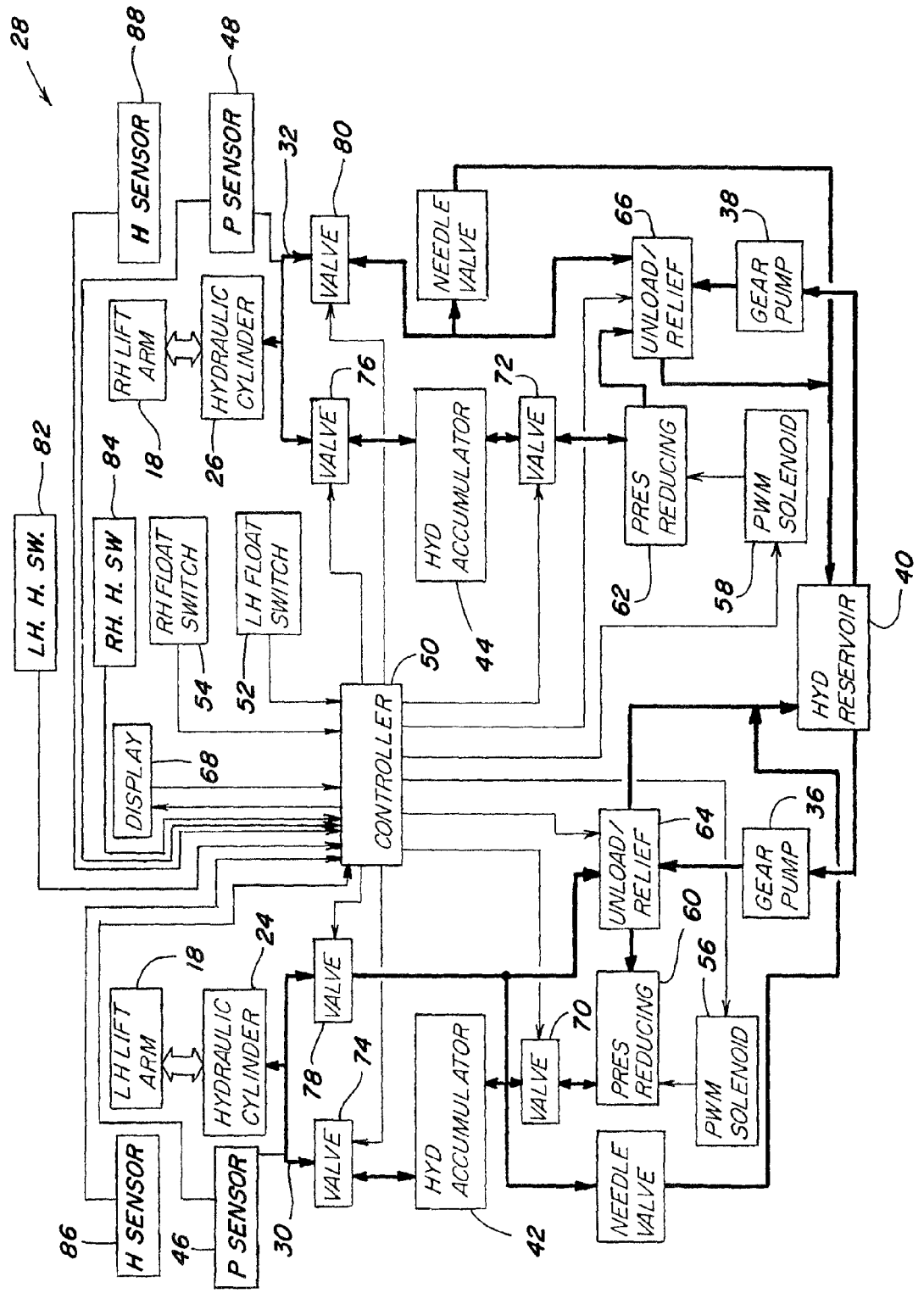
FIG. 5 is a schematic of hydraulic, mechanical and electrical sub-systems of the machine and system of the invention.

Referring also to FIG. 5, in a preferred embodiment, the header flotation and lift system 28 of the invention includes two basically similar left hand (LH) and right hand (RH) electro-hydraulic subsystems 30 and 32 for controlling cylinders 24 and 26, respectively. For convenience of assembly and operation, the majority of the components are housed in a single valve body 34 (FIG. 4) with appropriately located ports and other necessary connection devices and fixtures.

Essentially, system 28 is configured such that hydraulic fluid is pumped by fixed displacement pumps 36, 38 into subsystems 30, 32 respectively, from reservoir 40, through the various circuits or fluid paths of subsystems 30 and 32, as directed by control valves, to accumulators 42, 44, to hydraulic cylinders 24 and 26, and back to reservoir 40 as appropriate. The hydraulic pressures in respective cylinders 24 and 26 are monitored by LH and RH pressure sensors 46 and 48, respectively, connected to a multi-channel programmable controller 50 by suitable conductive paths, such as wires of a wiring harness, wireless network, or the like, for outputting information representative of the pressures in the cylinders thereto, respectively.

Controller 50 is configured and operable for receiving float force command signals from operator controlled LH and RH float switches 52, 54, and to output control signals to PWM (pulse width modulated) solenoids 56, 58 which control PRVs (proportional pressure reducing valves) 60 and 62; to unload/relief valves 64, 66; and to solenoids controlling other valves, including lower valves 70, 72; float valves 74, 76; and raise valves 78, 80, of the respective subsystems 30 and 32 also connected to controller 50 by suitable conductive paths, for managing the lift and flotation functions as commanded by the operator through LH and RH float switches 52, 54, and LH and RH height switches 82, 84 also connected to controller 50 via suitable conductive paths, as will be explained next. During such operation, information representative of various states and conditions of system 28 will be displayed on a display 68, in the well known manner.

LH and RH height switches 82 and 84 are operable by an operator for inputting height commands to controller 50, for setting the heights of the respective sides of header 14. LH and RH height sensors 86 and 88 are connected to controller 50 also, and are configured and operable for sensing the heights of the respective sides of header 14, and outputting information representative thereof to controller 50.

In operation, float switches 52 and 54 are operable for inputting float commands to controller 50. Controller 50 is programmed to automatically respond to certain commands by controlling the valves for allowing hydraulic fluid to enter accumulators 42, 44 (increasing the hydraulic pressure) to reduce the float force (flotation) with the ground, and to respond to other commands by controlling the valves to allow fluid to exit accumulators 42, 44 (reducing the hydraulic pressure) which increases the float force. This enables the float force for each side of the header to be adjusted independently, for instance, to compensate for an unbalanced header, which can result from the construction thereof, and/or uneven build up or distribution of material thereon, e.g., crop material and debris, mud, dirt, and the like, or to accommodate operator preference.

Additionally, once the flotation forces are set, controller 50 is programmed to be automatically operable for maintaining or holding the hydraulic pressure for the set force level, and if taken out of the float mode, to automatically return to the previous pressure when float operation is resumed. This is preferably done in a closed loop system involving the valves and using cylinder pressure information from pressure sensors 46 and 48. However, even with this feedback, as noted above, it has been observed that changes in physical and environmental parameters, such as external load condition such as from build up of plant material, mud, soil and the like on the header, drying of mud, and cleaning, can change the float force resulting from a given pressure condition in cylinders 24, 26. As a consequence, a given pressure may not result in the same operational performance and/or feel as originally sought, e.g., greater or lesser vibrations or impact forces from ground contacts, etc., which can result in operator dissatisfaction, and the need or desire for adjusting float force settings, sometimes frequently, depending on frequency and/or amount of changes in the environmental parameters and the like.

Cylinders 24 and 26 are utilized for both raising and lowering header 14 relative to tractor 12 of windrower 10 (e.g., as shown in FIGS. 1, 2, 3 and 4) through a range of positions, from a lowermost position wherein the header is supported on a surface therebelow such as the surface of a field (e.g. FIG. 1), through a range of intermediate positions (e.g. FIGS. 2 and 4) to an uppermost position (FIG. 3), and for sidewardly or laterally tilting header 14 relative to tractor 12, as denoted by arrow A in FIG. 4. Controller 50 is programmed to operate lower valves 70, 72 in conjunction with appropriate ones of valves 60, 62, 64 and 66, for effecting lowering of the header responsive to lower commands received from switches 82, 84, respectively; and to operate raise valves 78, 80 in conjunction with appropriate ones of those valves for raising the header responsive to raise commands.

Typically, when in the lowermost or ground contact or following mode, it will be desirable for header 14 to be operated in a float mode, to facilitate travel over changing ground contours and topography, surface irregularities, and the like, with minimal impacts and vibration, and a full float capability will be utilized, such that the header can responsively move both upwardly and downwardly for following changing contours. In addition to being operable for providing this float capability, controller 50 is programmed to be operable to monitor height or position information from sensors 86 and 88, and automatically control the valves in a closed loop system to control or limit the velocity or rate of lowering the header when in the float mode. Controller 50 is also configured to be operable to automatically control the valves to hold the header at a commanded or set height position, with just an up-float capability, that is, allowing contact with raised ground features, obstacles and the like to raise the header, but not allow it to fall below the set height.

Here, it should be noted that system 28 is preferably configured to utilize only two drivers or cylinders 24, 26, one on each side of the header, for performing both lift and height control functions, as well as controlling float when used. That is, cylinders 24, 26 will be used for establishing the height of the header, and thus the cutting height of the cutters, and also for lifting the header from the cutting height such as typically done when turning in the headlands of a field, and for travel between fields and on roads, and for controlling the applied float force, if any, and movements responsive to contact with ground features and the like.

Figure 6:
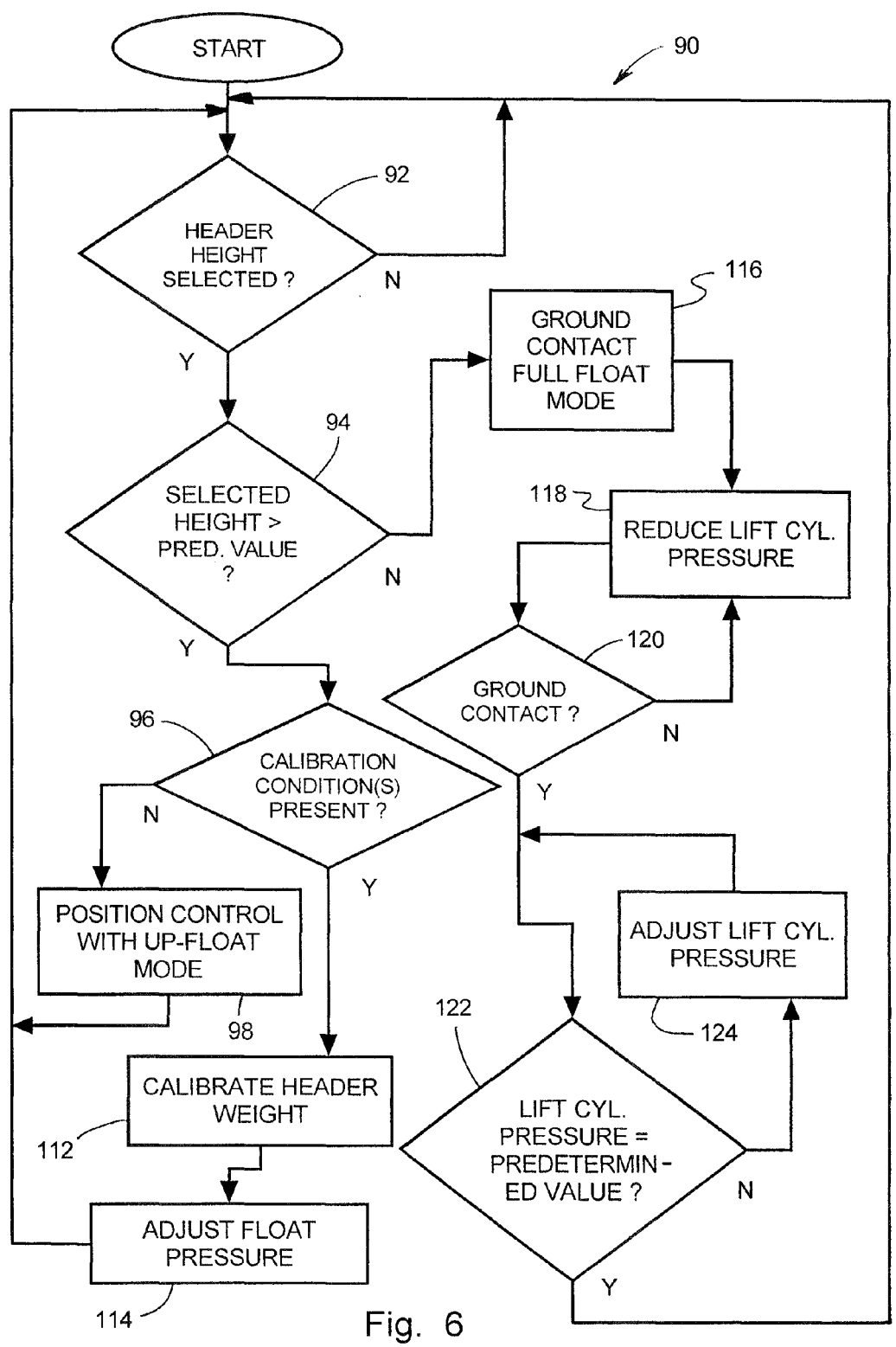
FIG. 6 is a high level flow diagram showing steps of a preferred method of the invention.
Figure 7:
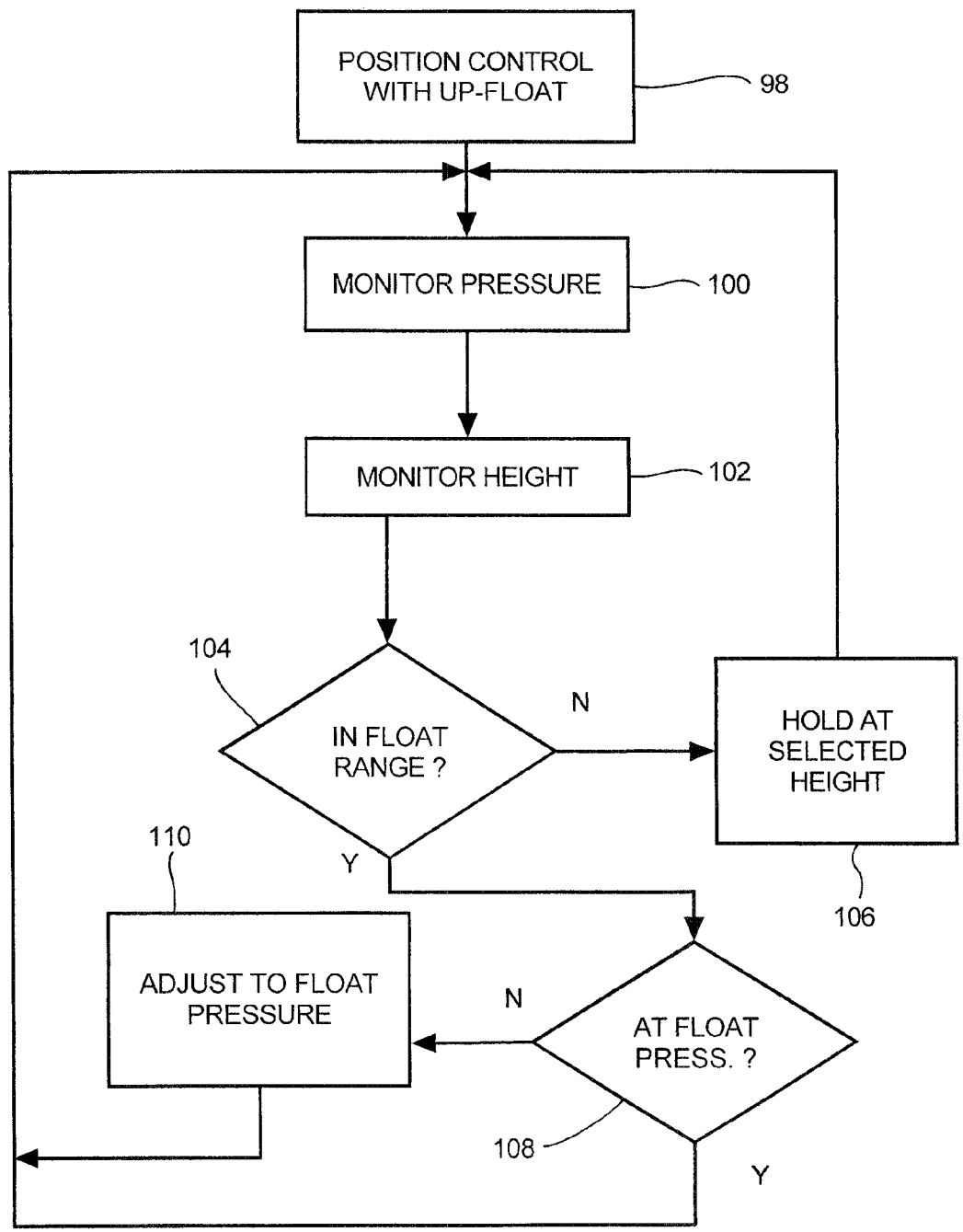
FIG. 7 is another high level flow diagram showing additional steps of the preferred method of FIG. 6.

Referring also to FIGS. 6 and 7, a flow diagram 90 showing steps of a preferred method of operation of system 28 for managing the operation of cylinders 24, 26 in two modes, including a first mode allowing operator settable and controllable header height with an up-float capability, and a second ground contact mode having a full float capability, is shown. Controller 50 of system 28 is automatically operable for switching between the two modes responsive to predetermined input commands, here the commands being selected to be height commands, and controller 50 can additionally automatically calibrate or adjust for changes in header weight (e.g., resulting from build up of crop material, mud, soil, etc.) under certain conditions or at certain times, to maintain consistent float forces and continuity of feel, e.g., in response to ground contact.

To initiate the above described operation according to the invention, controller 50 automatically monitors outputs of height switches 82 and 84 for height commands, as denoted by decision block 92. If a height command having a value greater than a predetermined value is received, for instance, one representative of a cutting height for leaving stubble on a field (e.g., between just an inch or so and up to 24 inches) such as the height shown in FIGS. 2 and 4, as denoted at decision block 94, controller 50 will then determine if a condition or conditions suitable for calibrating the weight value for header 14 conditions are present, as denoted at block 96. Here, a condition selected as suitable for calibrating header weight is a high height position, for instance, one greater than a normal cutting position, such as would be selected for turning in a headland of a field, or for travel between fields, road travel, etc. Another condition could be a sharp or prolonged turn as would be used in a headland. If the calibration condition or conditions is/are not present in block 96, e.g., header not raised to selected height, no indication of headland turning, etc., controller 50 will commence operation in the position control with up-float mode, as denoted at block 98.

Referring in particular to FIG. 7, in the position control with up-float mode as denoted by block 98, controller 50 will control cylinders 24, 26 to move header 14 to the selected height or heights (if lateral tilt selected), relative to a datum such as the maximum height, and will monitor pressure signals from sensors 46, 48, as denoted at block 100, and header height signals from sensors 86, 88, as denoted at block 102. If the height information indicates that the header is maintaining the set position, as determined at decision block 104, and has not moved into a float range above the set height, such as would occur as a result of contact with the ground or a raised ground feature, controller 50 will position the header at the set height, and loop through the steps of blocks 100, 102, 104 and 106 until a new height command is received or the header is moved up into the float range by an external force.

If at block 104 the height is in the float range above the set value for either of the cylinders, e.g., from ground contact, controller 50 will determine if the pressure conditions in respective cylinders 24, 26 is at the level corresponding to the present float force setting (if any) for that cylinder, as denoted by decision block 108. If the pressure is not at the float pressure, controller 50 will automatically adjust the pressure or pressures, to the float pressure or pressures, as denoted by block 110, and loop through the steps of blocks 100 through 106 or 110, until another height command is received. Additionally in this mode, controller 50 can be programmed to control the velocity of downward movements or fall rate of header 14, if desired, in a closed loop system with height sensors 86, 88, and a suitable device for allowing operator inputs of a fall or downward velocity setting can be provided.

Returning to FIG. 6, if at block 96 the calibration condition or conditions is/are present, controller 50 is programmed to automatically determine and calibrate a value representative of the present header weight, as denoted by block 112, such as by analyzing pressure conditions in cylinders 24, 26 required for holding header 14 stationary at a selected raised height. This can be done using averages or other mathematical means to reduce effects of dynamic conditions, and controller 50 will automatically store this value and adjust the pressure conditions in the cylinder or cylinders, as required, as denoted by block 114, and loop back to block 92 or another desired step. Here, as discussed above, various parameters can affect the applied float force for a given setting of switches 52, 54, namely, header weight variations resulting from such factors as increases in weight from build up of crop material, mud, etc., or decreases from drying mud, cleaning, etc., and adjusting the float pressure for such variations on an automatic and relatively frequent basis will provide consistent float force and resulting feel, e.g., vibrations etc. from ground contact and the like.

Returning to decision block 94, if a height command of the predetermined value, or less, is received, operation in the full float mode will commence, as denoted by block 116. Again, a preferred predetermined value is a zero or minimum height setting of switches 82, 84, which would typically be selected when it is desired to operate in a ground following mode such as shown in FIG. 1. In the full float mode, controller 50 will automatically reduce cylinder pressure until a pressure change indicative of ground contact is achieved, as denoted by block 118 and decision block 120. Controller 50 will then determine if the cylinder pressure conditions are at the predetermined value for applying the set float force, as denoted at decision block 122. This will be the pressure determined from the header weight calibration routine, or, if that is not present, an earlier set or determined value. If the pressure is not at the predetermined value, it will be adjusted, as denoted at block 124, and controller 50 will loop through the steps of blocks 122 and 124 until the height setting is changed. Additionally, in the full float mode, controller 50 can be programmed to control the velocity of movements of header 14, particularly downward velocity or fall rate, in a closed loop system using the height information from the height sensors. System 28 will then operate in this mode until a different height command is received.

It will be obvious to those skilled in the art that various changes may be made without departing from the scope of the invention and the invention is not to be considered limited to what illustrated in the drawings and described in the specification.

What is claimed is:

1. A method of controlling movements of a header of a plant cutting machine, comprising steps of:
   providing a control system including at least one driver connected between the header and a frame of the machine and controllably operable for raising and lowering the header, a controller connected in operative control of the at least one driver, an input device connected to the controller and operable for inputting height commands thereto, a pressure sensor operable for determining a pressure condition in the at least one driver and outputting information representative thereof to the controller, and a height sensor operable for determining a height of the header and outputting information representative thereof to the controller;
   automatically monitoring height commands received from the input device, and:
   if a height command having a value greater than a predetermined value is received, then automatically controlling the at least one driver to position the header at the commanded height, and subsequently automatically controlling the header in an up-float mode allowing the header to be moved upwardly from the commanded height by exertion of an external upwardly directed force thereagainst, and allowing the header to move downwardly to the commanded height when the force is reduced or removed; and
   if a height command having the predetermined value or a lower value is received, then automatically controlling the header in a full float mode supported by a surface therebeneath wherein the header is movable upwardly and downwardly responsive to changes in elevation of the surface.

2. The method of claim 1, wherein the predetermined value is zero.

3. The method of claim 1, comprising an additional step of:
   if a height command having a value equal to or greater than a predetermined high value is received, then responsively moving the header to the commanded height equal to or greater than the predetermined high value in a non-float mode, and automatically determining and storing a value representative of a weight of the header as a function of a pressure condition required for supporting the header at the commanded height in the non-float mode.

4. The method of claim 3, comprising an additional step of:
   automatically determining a pressure to be exerted upwardly against the header when in at least one of the float modes, as a function of the value representative of the weight of the header.

5. The method of claim 1, comprising an additional step of:
   when in at least one of the float modes, exerting an upwardly directed float force against the header for reducing an amount of externally applied force required for moving the header upwardly.

6. The method of claim 5, wherein the float force is selectable.

7. The method of 5, wherein the at least one driver comprises a fluid cylinder; and
   when in the float modes, automatically maintaining fluid pressure in the fluid cylinder sufficient for exerting the float force against the header.

8. The method of claim 7, comprising additional steps of:
   providing two of the fluid cylinders in support of opposite sides of the header, respectively, the controller being configured and operable for simultaneously maintaining the fluid pressures in the fluid cylinders at different values, and
   determining the values for the fluid pressures in the cylinders required for exerting the float force substantially equally against the opposite sides of the header, as a function of load conditions exerted thereagainst, respectively.

9. The method of claim 8, wherein the load conditions exerted against the opposite sides of the header are at least partially a function of a weight of the header supported by the cylinders, respectively.

10. The method of claim 7, comprising additional steps of:
    providing a closed loop system configured and operable for automatically controlling the fluid pressure in the fluid cylinder for exerting the float force against the header, and for controlling velocity of downward movements of the header.

11. A flotation and lift control system for a header of a plant cutting machine, comprising:
    at least one driver connected between the header and a frame of the machine and controllably operable for raising and lowering the header;
    a controller connected in operative control of the at least one driver;
    an input device connected to the controller and operable for inputting height commands thereto;
    at least one pressure sensor operable for determining a pressure condition in the at least one driver and outputting information representative thereof to the controller;
    at least one height sensor operable for determining a height of the header and outputting information representative thereof to the controller;
    wherein the controller is configured and operable for automatically monitoring height commands received from the input device, and:
    if the controller receives a height command having a value greater than a predetermined value, then the controller will automatically control the at least one driver to position the header at the commanded height, and subsequently automatically control the header in an up-float mode allowing the header to be moved upwardly from the commanded height by exertion of an external upwardly directed force thereagainst, and allow the header to move downwardly to the commanded height when the force is reduced or removed; and
    if the controller receives a height command having the predetermined value or a lower value, then the controller will automatically control the header in a full float mode so as to be supportable by a surface therebeneath and wherein the controller will allow the header to be movable upwardly and downwardly responsive to changes in elevation of the surface.

12. The system of claim 11, wherein the predetermined value is zero.

13. The system of claim 11, wherein the controller is configured and operable such that when a height command having a value equal to or greater than a predetermined high value is received, the controller will automatically controllably operate the at least one driver to responsively position the header at the height equal to or greater than the predetermined high value in a non-float mode, and automatically determine and store a value representative of a weight of the header as a function of a pressure condition required for supporting the header.

14. The system of claim 13, wherein the controller is configured and operable to automatically determine a pressure to be exerted upwardly against the header when in at least one of the float modes, as a function of the value representative of the weight of the header.

15. The system of claim 11, wherein the controller is configured and operable such that when the header is in at least one of the float modes, the controller will automatically operate the at least one driver for exerting an upwardly directed float force against the header for reducing an amount of externally applied force required for moving the header upwardly.

16. The system of claim 15, wherein the float force is selectable.

17. The system of 15, wherein the at least one driver comprises a fluid cylinder; and the controller is configured such that, when in the float modes, the controller will automatically maintain the fluid pressure in the fluid cylinder sufficient for exerting the float force against the header.

18. The system of claim 17, comprising two of the fluid cylinders in support of opposite sides of the header, respectively, the controller being configured and operable for automatically simultaneously maintaining the fluid pressures in the fluid cylinders at different values, and wherein the controller will automatically determine the values for the fluid pressures in the cylinders required for exerting the float force substantially equally against the opposite sides of the header, as a function of load conditions exerted thereagainst, respectively.

19. The system of claim 18, wherein the load conditions exerted against the opposite sides of the header are at least partially a function of a weight of the header supported by the cylinders, respectively.

* * * * *